No. 796,183. PATENTED AUG. 1, 1905.
O. BRADFORD.
MACHINE FOR MANUFACTURING EXPANDED METAL.
APPLICATION FILED OCT. 27, 1904.
5 SHEETS—SHEET 1.
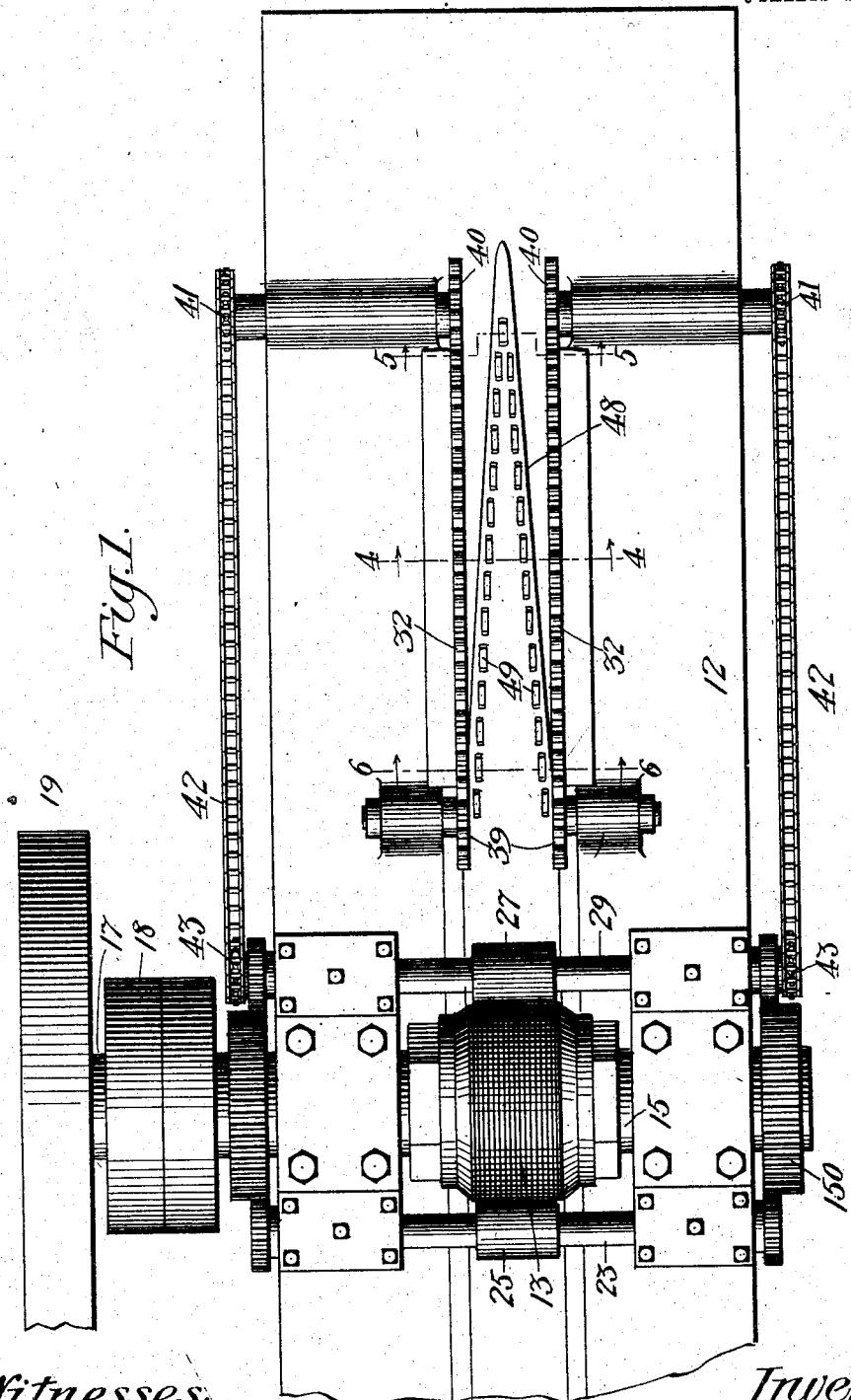
Witnesses:
Inventor.
Oscar Bradford,
By Munday, Evarts & Adcock,
His Attys No. 796,183. PATENTED AUG. 1, 1905.
O. BRADFORD.
MACHINE FOR MANUFACTURING EXPANDED METAL.
APPLICATION FILED OCT. 27, 1904.
5 SHEETS—SHEET 2.
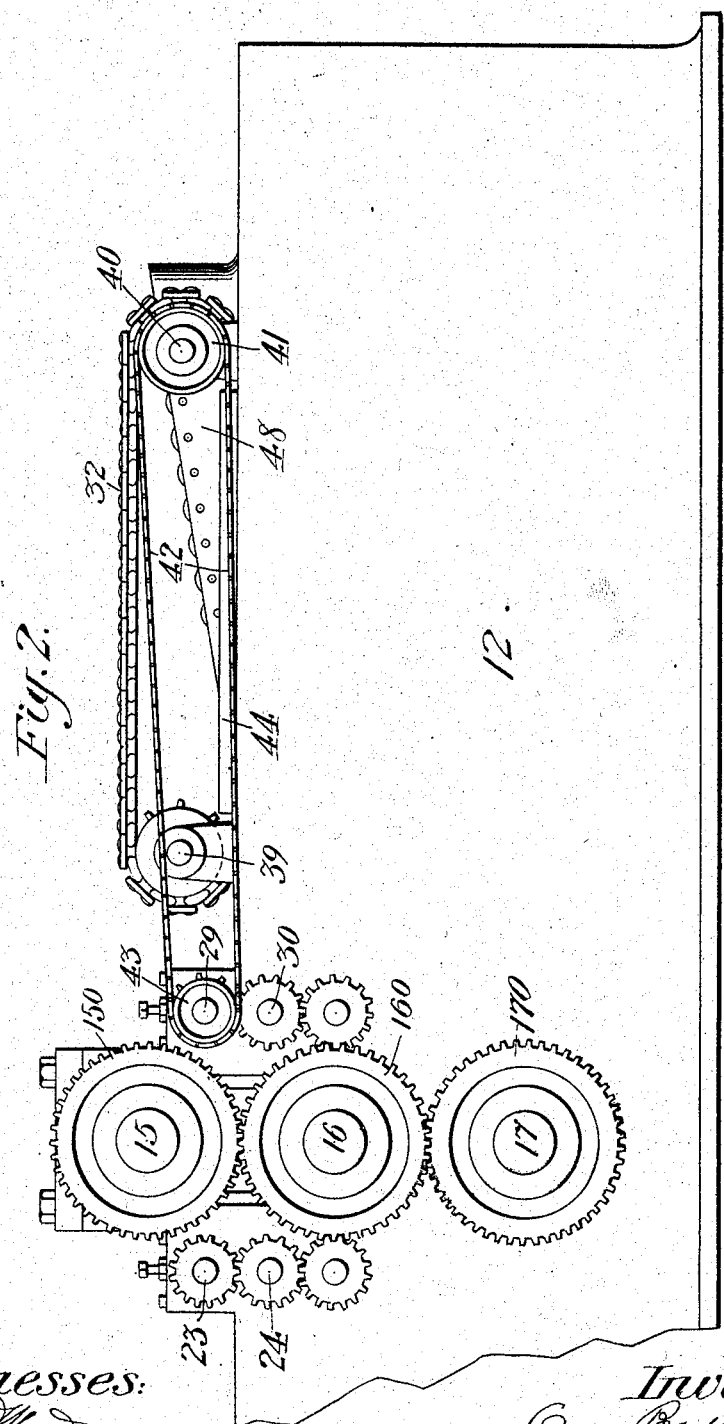

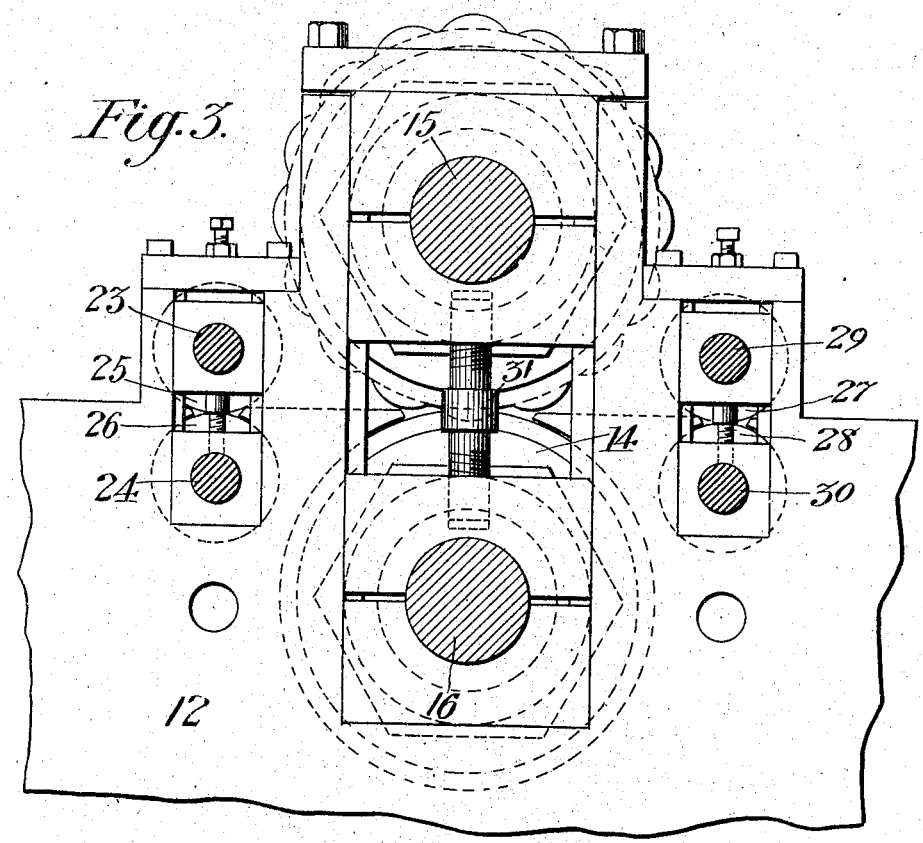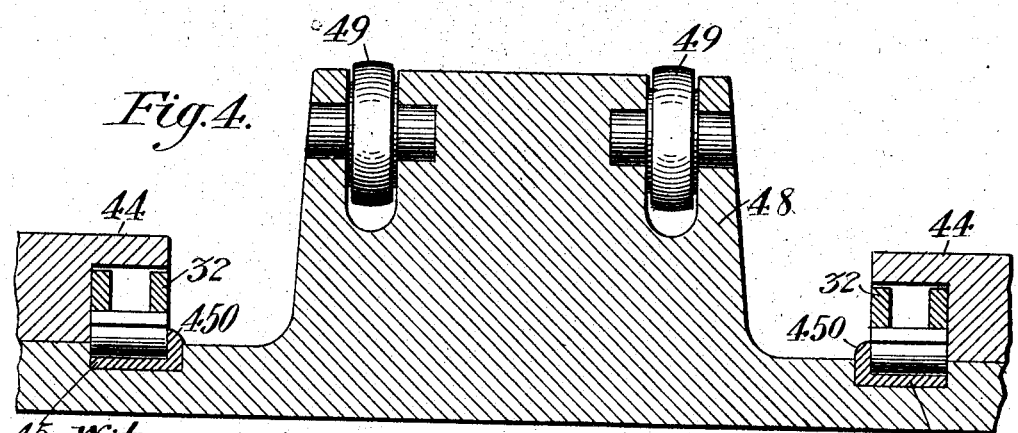

No. 796,183. PATENTED AUG. 1, 1905.
O. BRADFORD.
MACHINE FOR MANUFACTURING EXPANDED METAL.
APPLICATION FILED OCT. 27, 1904.
5 SHEETS—SHEET 4.
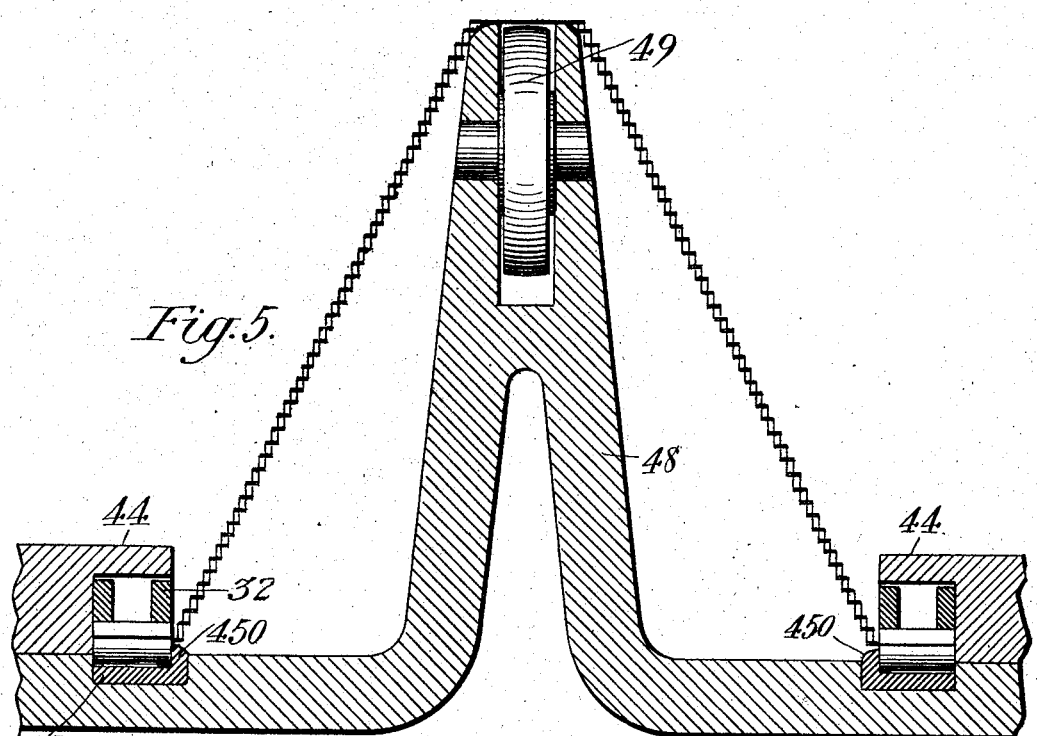
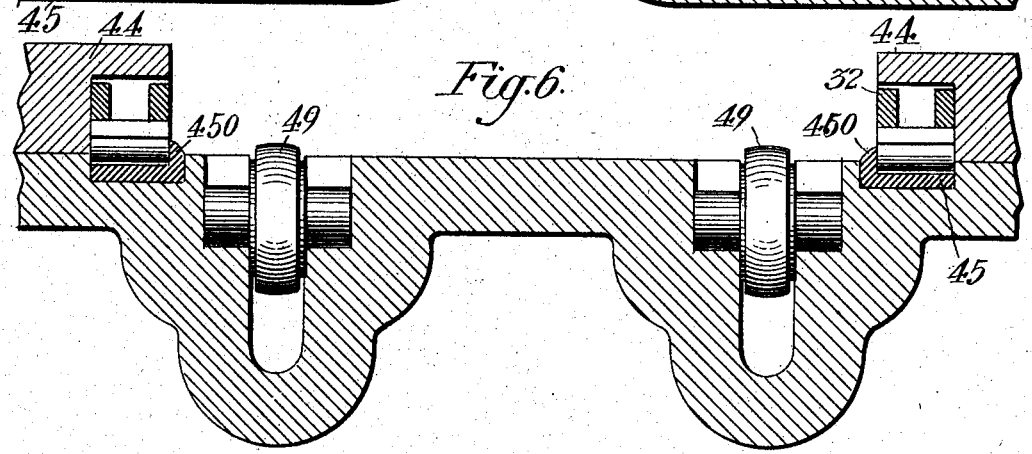
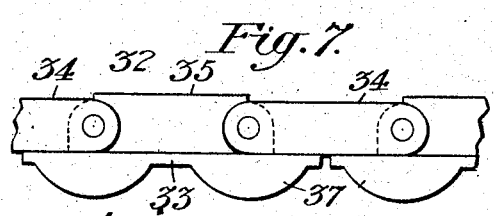
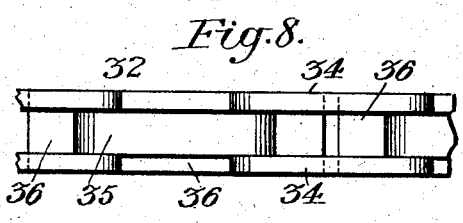

No. 796,183. PATENTED AUG. 1, 1905.
O. BRADFORD.
MACHINE FOR MANUFACTURING EXPANDED METAL.
APPLICATION FILED OCT. 27, 1904.

5 SHEETS—SHEET 5.

Witnesses:
Inventor:
Oscar Bradford,
By Munday, Evarts & Adcock
His Atty

UNITED STATES PATENT OFFICE.

OSCAR BRADFORD, OF CHICAGO, ILLINOIS.

MACHINE FOR MANUFACTURING EXPANDED METAL.

No. 796,183.             Specification of Letters Patent.             Patented Aug. 1, 1905.

Continuation of abandoned application Serial No. 162,530, filed June 22, 1903. This application filed October 27, 1904. Serial No. 230,177.

*To all whom it may concern:*

Be it known that I, OSCAR BRADFORD, a citizen of the United States, residing in Chicago, in the county of Cook and State of Illinois, have invented a new and useful Improvement in Machines for Manufacturing Expanded Metal, of which the following is a specification.

This invention relates to machines for manufacturing expanded metal, and is a continuation of a previous application filed by me June 22, 1903, Serial No. 162,530. The main feature of it is found in the construction of the expanding devices, and the nature of my improvements will be fully understood from the accompanying drawings and the description thereof, which I give below.

Figure 9:
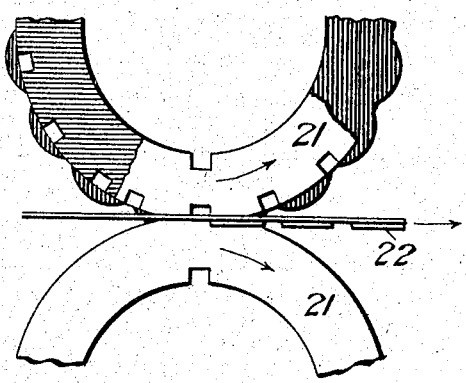
Figure 10:
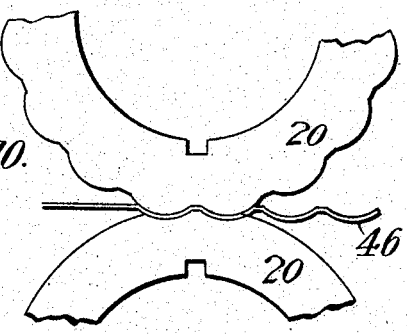
Figure 11:
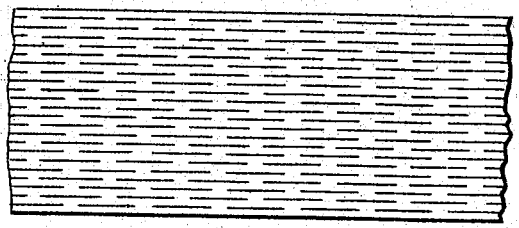
Figure 12:

In the drawings, Figure 1 is a plan of the invention, and Fig. 2 a side elevation. Fig. 3 is an enlarged sectional view of the slitting mechanism. Figs. 4, 5, and 6 are transverse vertical sections of the expanding mechanism on the lines 4 4, 5 5, and 6 6, respectively, of Fig. 1. Fig. 7 is a side, and Fig. 8 a plan, of the chain for holding the edges of the metal during the expanding operation. Fig. 9 is a partial transverse vertical section of the slitting-rolls. Fig. 10 is a partial end elevation of said rolls. Fig. 11 shows the slitted sheet in plan, and Fig. 12 is an edge view thereof.

In said drawings, 12 is the frame of the machine and supports both the slitting and the expanding mechanisms. Both mechanisms receive power from shaft 17, driven by belt-pulley 18 and carrying a fly-wheel 19 and a gear 170.

13 is the upper slitting-roll the shaft of which is shown at 15, and 14 is the lower roll and is mounted on shaft 16. The shafts are geared together by gears 150 and 160, and one of these gears 160 is in mesh with gear 170. The sheet is fed to the slitting-rolls by feed-rolls 25 and 26 upon shafts 23 and 24, carrying intermeshing pinions connected with the gear 160 by an intermediate, as plainly shown at Fig. 2, and it is fed from the slitting-rolls by other feed-rolls 27 and 28 on shafts 29 and 30, carrying intermeshing pinions receiving power from gear 160 through an intermediate, as also shown at Fig. 2. One of the screws by which the slitting-roll bearings are adjusted relatively is shown at 31.

The slitting-rolls are made up of series of cutting-rings and spacing-rings arranged alternately and preferably constructed in accordance with the patent granted to Lewis E. Curtis April 9, 1901, No. 671,915. I show at Fig. 10 the cutters employed for cutting the slits nearest the edge of the sheets, the upper one being adapted to depress the severed edge of the metal, so as to form the loops 46. (Shown particularly at Figs. 10 and 12.) The cutters 21 (shown at Fig. 9) form all the slits except those nearest the edges. By the cutters 20 the sheet is put in condition to be controlled by the expanding devices now to be described. The sheet after being slitted is received by the rolls 27 and 28 and delivered by them to the expanding devices, which consist of means for holding and feeding the edges of the sheet along in a fixed plane and means for forcing the middle or intermediate portions of the sheet away from that plane, thereby causing the opening of the slits. In the construction illustrated I show the edge holding and feeding devices as being formed, in part, of a pair of sprocket-chains 32, each taking hold of one of the edges of the sheet. These chains consist of links 33, adapted to engage and carry the sheet and coupling-links 34, pivotally united to links 33. The links 33 are formed with a central upright portion 34 and a bottom web 36, and upon the under surface of the bottom are round-surfaced depending projections 37, each link 33 having two of these projections. Each of the chains is carried upon its own sprocket 39 and 40, and of these the wheels 40 are upon the same shafts with sprocket-wheels 41, which are driven by chains 42 from sprocket-wheels 43 on the shaft of the feed-roll 27. Each of the chains 32 in passing from sprocket 39 to sprocket 40 moves horizontally through a confined space or guideway formed by the angle-bar 44, inclosing the chain at the top and on the outside, and the bottom angle-iron 45, inclosing the chain at the bottom and partially inclosing it upon the inside, as plainly indicated at 450 in Figs. 4, 5, and 6, the bars 44 and 45 extending all the way between the sprockets. The depending projections 37 are of such shape and dimensions and so spaced as to enable them to enter and conform approximately to the looped edge strands 46. (Shown at Fig. 12.) The sheets are projected forward by rolls 27 and 28, so that their looped edges enter the guideways at each side and between the chains and their respective bars 45, thus causing the projections 37 of the chain to enter the loops 46 of the sheets in succession and remain in them until the chains pass upward upon the sprockets 40. It will be seen that the sheet will by this construction be compelled to travel with the chains while its edges are in the guideways and that during this travel the sheet cannot escape from the chains, because the inner edges of loops 46 engage the upright portion 450 of bars 45 and prevent any such result. While both edges of the sheet are thus held by the chains and while the chains are moving through their fixed guideways, which preferably are in the same horizontal plane, I cause the opening of the sheet by displacing or forcing the central or middle portion of the sheet away from the plane of the edge-holding devices. This may be done in any suitable way— as, for instance, by compelling the middle portion of the sheet to ride over an incline, such as that shown at 48, the contact-surface of which is preferably formed of antifriction-rollers 49. This incline acts gradually on the sheet as the latter moves along, the expansion reaching its maximum when the sheet arrives at the highest point of the incline. The shortening of the sheet during the expansion is permitted by making the projections 37 somewhat smaller in the direction of the length of the sheet than the loops 46, so that the engaged strands may shift somewhat lengthwise of the chains and by making the expanding incline shorter than the sheet, so that only a portion of the sheet will be undergoing the opening operation at any one time. The several strands of the intermediate portions of the sheet may be forced slightly below the level of the sheet in the slitting operation, as shown at 22 in Fig. 9.

It will be understood that I do not wish to be limited to this relative arrangement of the central incline or support and the feeders nor to the construction of these devices, as the essential feature of the invention is the gradual divergence in the planes of the support and the feeders, so that the sheet is gradually widened as it moves along the support.

I claim—

1. The combination in a metal-expanding machine of moving devices adapted to engage and hold the edges of the sheet, with an expanding device consisting of an incline over which the central portion of the sheet is carried by the edge-holding devices, substantially as specified.

2. The combination in a metal-expanding machine of sheet-feeding devices adapted to engage and hold the edges of the sheet and an expanding device constructed and arranged to force the center of the sheet from the plane of the feeding devices, substantially as specified.

3. The combination in a metal-expanding machine of sheet-feeding devices adapted to engage and hold the edges of the sheet, and a stationary incline constructed and arranged to force the center of the sheet from the plane of the edges and thus to open its slits, substantially as specified.

4. The combination in a metal-expanding machine of sheet-feeding devices adapted to hold the edges of the sheet, and a stationary expanding device located between the sheet-feeding devices and constructed and arranged to force the center of the sheet away from the plane of the feeding devices, substantially as specified.

5. The combination in a metal-expanding machine, of horizontally-moving sheet-feeding devices adapted to engage and hold the edges of the sheet, and an expanding device constructed and arranged to force the center of the sheet away from the plane of the feeding device, substantially as specified.

6. The combination in a metal-expanding machine, of means adapted to hold the edges of the moving sheet in a fixed plane, and means for displacing or forcing the middle portion of the sheet away from that plane, substantially as specified.

7. The combination in a metal-expanding machine of a support for the middle portion of the sheet, and sheet-feeding devices adapted to take hold of the edges of the sheet and draw it over, and away from the plane of said support, substantially as specified.

8. The combination in a metal-expanding machine of a support for the center of the sheet and sheet-feeding devices adapted to take hold of the edges of the sheet, said feeding devices arranged to move in a plane diverging from the plane of the support, substantially as specified.

9. The combination in a metal-expanding machine of a support for the center of the sheet and sheet-feeding devices adapted to take hold of the edges of the sheet, said sheet-feeding devices arranged to move in a plane diverging in a vertical direction from the plane of the support, substantially as specified.

10. The combination in a metal-expanding machine of a stationary support for the center of the sheet provided with devices for relieving the friction, and sheet-feeding devices adapted to take hold of the edges of the sheet, said feeding devices arranged to move in a plane diverging from the plane of the support, substantially as specified.

11. The combination in a metal-expanding machine of a stationary support of less width than the sheet and over which it may be fed, and feeding devices adapted to take hold of the edges of the sheet and force it over said support, but moving in a plane diverging from the plane of the support, substantially as specified.

12. In a machine for expanding slitted metal sheets, feeding mechanism for gripping the sheet at its marginal portions and a support for the center of the sheet, the plane of the feeding mechanism and the plane of the support gradually separating in a direction at right angles to the plane of the sheet, substantially as specified.

OSCAR BRADFORD.

Witnesses:
    PEARL ABRAMS,
    H. M. MUNDAY.